United States Patent [19]

Moulton

[11] Patent Number: 4,540,190
[45] Date of Patent: Sep. 10, 1985

[54] BICYCLE FRAME

[75] Inventor: Alexander E. Moulton, Bradford on Avon, England

[73] Assignee: Alex Moulton Limited, Wiltshire, England

[21] Appl. No.: 556,936

[22] Filed: Dec. 1, 1983

[30] Foreign Application Priority Data

Dec. 1, 1982 [GB] United Kingdom ............... 8234199
Dec. 1, 1982 [GB] United Kingdom ............... 8234233

[51] Int. Cl.³ ............................................. B62K 15/00
[52] U.S. Cl. ................................ 280/278; 280/281 R; 280/287
[58] Field of Search ..................... 280/278, 287, 281 R

[56] References Cited

U.S. PATENT DOCUMENTS 3,083,039  3/1963  Moulton ............................... 280/277
3,220,748  11/1965  Moulton ............................... 280/287

FOREIGN PATENT DOCUMENTS 892535  4/1944  France ............................ 280/281 R
2480221  10/1981  France ............................ 280/281 R
2538  of 1897  United Kingdom ............ 280/281 R
5035  of 1901  United Kingdom ............ 280/281 R
7289  of 1915  United Kingdom ............ 280/281 R

*Primary Examiner*—John A. Pekar
*Attorney, Agent, or Firm*—Dennison, Meserole, Pollack & Scheiner

[57] ABSTRACT

A frame for a bicycle in which two beams, which intersect to form a cruciform, in side elevation, extend between a head tube and a seat tube. Each beam being structurally efficient in the transverse plane. The cruciform being rendered structurally efficient in the vertical plane by a tie running beneath the cruciform and extending between lower regions of the head and seat tubes. The front and rear parts of the frame are separably joined to one another at the junction of the cruciform by means of a first coupling. The tie also being separable into front and rear parts, by means of a second coupling located immediately below the first coupling.

7 Claims, 7 Drawing Figures

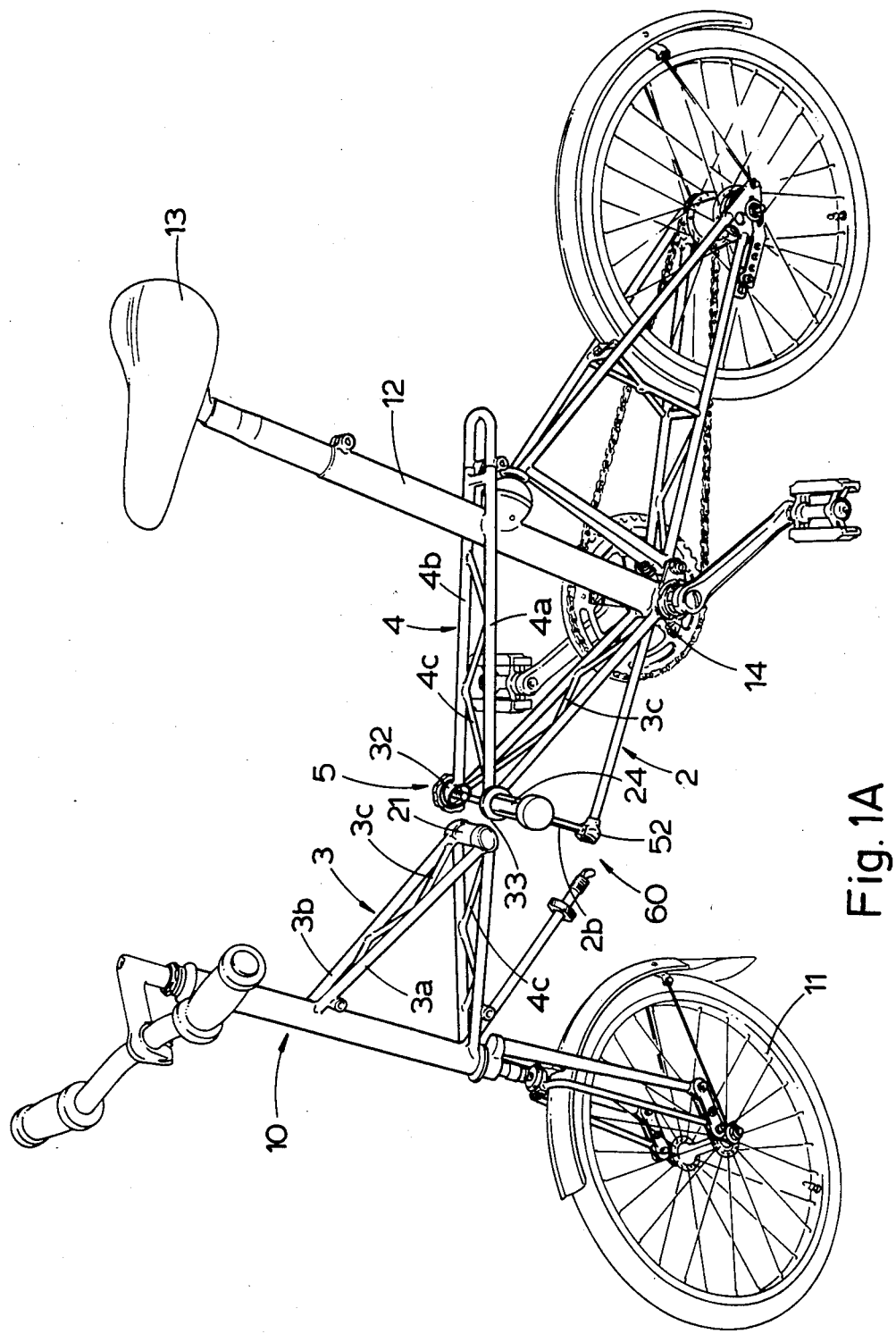

BICYCLE FRAME

This invention relates to frames for bicycles.

Bicycle frames are familiar in which the head tube (that is the tube which houses the steering column) and the seat tube (that is the tube surmountd by a saddle and having at its lower end a pedal crank axle housing) are united by tubing of large diameter, 1.5-2 inches, which tubing may have some trussing.

In the evolution of the bicycle towards low weight whilst retaining high lateral stiffness as well as torsional stiffness about the longitudinal axis of the frame, there is a limit to which the wall thickness of these large tubes can be reduced, whilst maintaining freedom from denting in handling and ease of jointing to the head tube and seat tube without the encumbrance of large lugs.

This invention has for its object to provide a bicycle frame of low weight. However, such low weight is not to detract from the structural stiffness of the frame.

To this end the invention provides a frame for a bicycle in which two beams, which intersect to form a cruciform in side elevation, extend between a head tube and a seat tube, each beam comprising two peripheral tubes spaced apart by structural web means and each beam being structurally efficient in the transverse plane, the cruciform being rendered structurally efficient in the vertical plane by a tie extending between lower regions of the head and seat tubes.

Advantageously use is made of very thin, say 0.02 inch wall thickness, steel tubes which, because of their small diameter (say 0.5 inch), are nevertheless resistful to denting by virtue of the diameter/thickness ratio. Moreover, these small tubes can be readily joined by means of small cast lugs which permit regular brazing methods.

To form each beam or beam section, two of these small tubes of a diameter not exceeding 0.75 inch, are advantageously arranged in 'duplex' form side by side. As the twin tubes uniting the seat tube with the head tube are arranged in cruciform when viewed from the side, and the members are made to be efficient beams in the transverse plane, then high torsional stiffness is obtained between the head tube and the seat tube.

In the vertical plane in which the weight of the rider is carried, the cruciform construction is manifestly weak, and therefore the tie extending between lower regions of the head and seat tubes is necessary to complete the structure. Twin tubes in V-configuration preferably connect the mid region of the tie with the intersecting beams at the node of the cruciform.

Any means can be used for making the twin duplex tubes effective as a beam in the transverse plane. For instance, a shear web of thin material with lightening holes can be used. Preferably a light gauge, 5/16" or 1/16" diameter, steel tube, jig-bent to form a lattice, can be brazed between the 'duplex' tubes to form an efficient shear element of the beam.

The 'duplex' members which form one beam of the cruciform are in use, generally horizontal. The triangular spaces partially enclosed by the 'duplex' members of the frame can readily be used with or without a light plastics cladding for the carrying of the tools for example.

The horizontal width between the small tubes which together form the 'duplex' members should be as wide as possible to provide lateral and torsional stiffness. This width preferably approximates that of the housing for the pedal crank axle at the bottom of the seat tube.

The cruciform bicycle frame described will be of light weight due to the use of small very light gauge tubes for its construction of minimum total weight.

A bicycle having a frame as above described may have its front and rear wheels resiliently suspended and the frame affords strong mounting points for the wheel suspensions.

The node or juncture of the cruciform makes a convenient point for demounting means for separating the rear triangle from the front triangle, given a similar break point in the bottom tie.

This invention has for a further object to provide a frame for a bicycle in which the frame is separable into two sections so that it may be more easily carried or stowed. However, such separability is not to detract from the structural stiffness of the frame.

To this end the invention, according to this aspect, provides a frame for a bicycle in which two beams, which intersect to form a cruciform, in side elevation, extend between a head tube and a seat tube, each beam being structurally efficient in the transverse plane, the cruciform being rendered structurally efficient in the vertical plane by a tie running beneath the cruciform and extending between lower regions of the head and seat tubes, the front and rear parts of the frame are separably joined to one another at the junction of the cruciform by means of a first coupling, the tie also being separable into front and rear parts, by means of a second coupling located immediately below the first coupling.

Advantageously the two couplings are of different types whereby the frame is separable by folding the two parts of it using one of the couplings as a hinge, this folding operation being possible only after the other coupling has been disengaged. The object here is that a bicycle with such a frame should not collapse after the first coupling has been released; on the contrary, the person handling the machine should be able to lay hands on both parts of the machine so that the two parts can be manipulated and prevented from toppling over during and after separation of the machine into two separately stowable parts.

Preferably the first coupling is a bolted sleeve joint and the second coupling is a hook and socket connection and in a preferred arrangement, when the bolt of the sleeve joint is removed, the frame remains structurally coherent except as against upward force exerted on the sleeve joint; and when this joint is lifted the frame partially separates and can be folded, with the hook and socket joint acting as a hinge until an instant when the hook can be disengaged from the socket whereupon the front and rear parts of the frame are separated.

The invention will be described with reference to the accompanying drawings.

In the drawings:

FIG. 1A is a side view showing a bicycle having a frame so separated.

Figure 1:
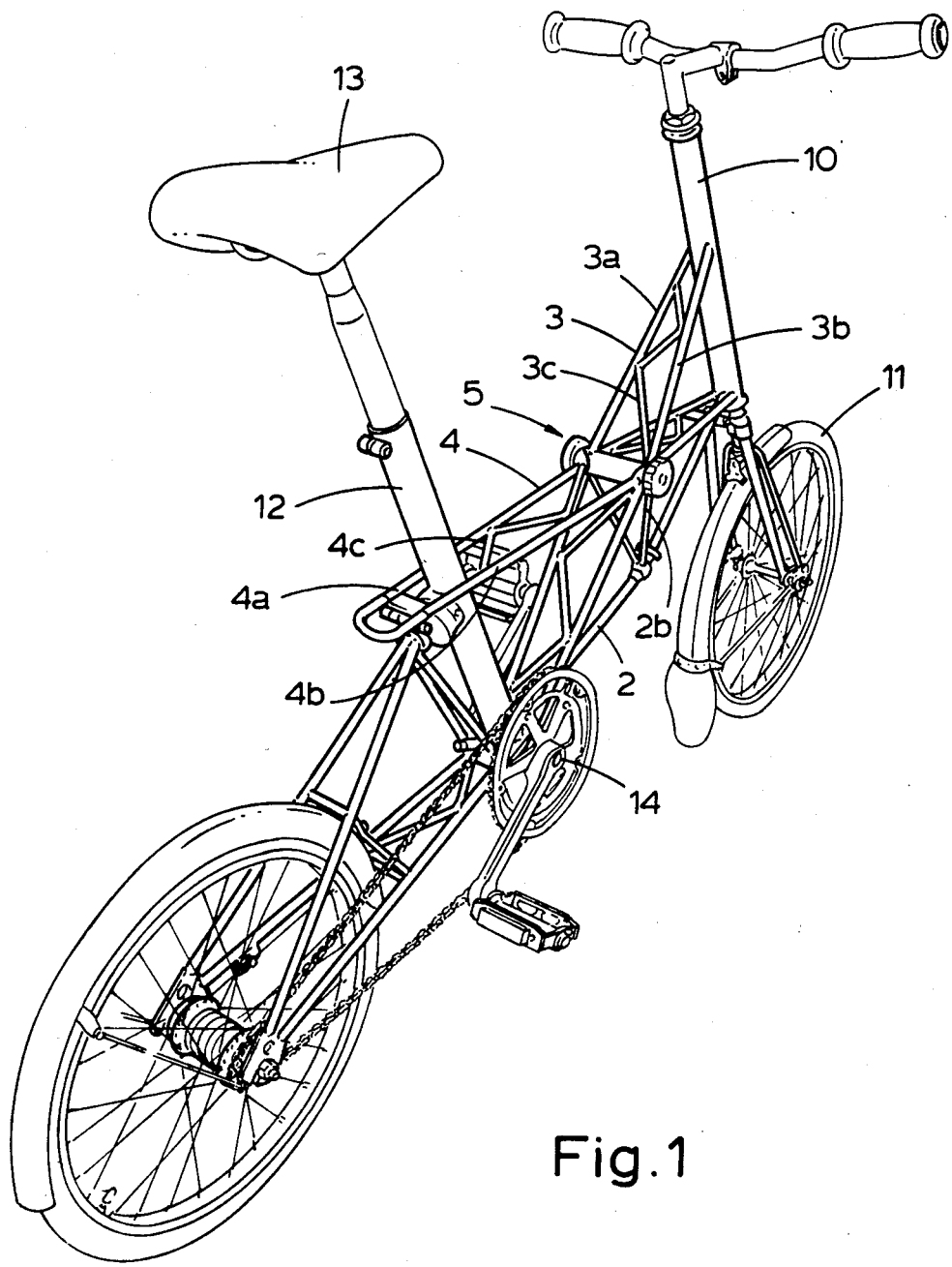
FIG. 1 is a perspective view of a bicycle having a frame separable into two parts according to the invention.
Figure 2:
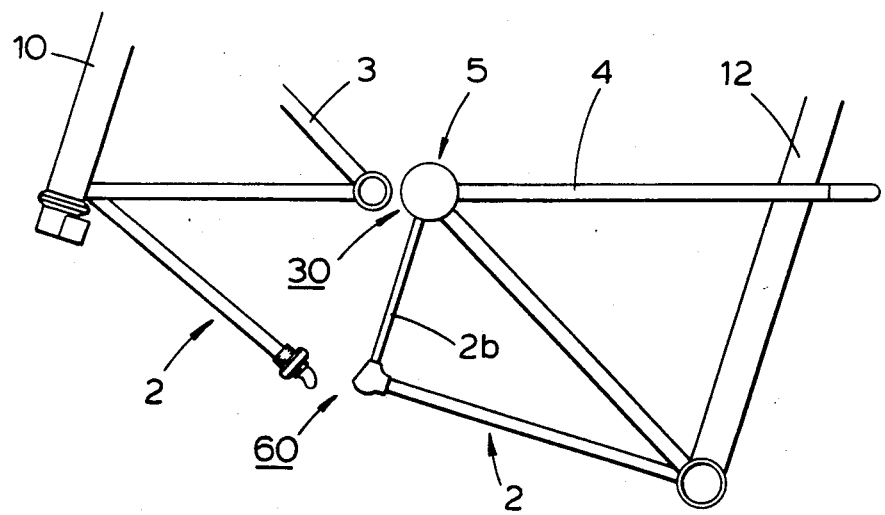
FIG. 2 is a side view of the frame showing the front and rear parts of the frame separated.

Referring first to FIG. 2, in order to provide a bicycle frame, the invention provides a frame in which two beams generally designated 3 and 4 intersect to form, in side elevation, a cruciform at 5. Each beam 3 and 4 extends between a head tube 10 which houses a steering column for steering front wheel 11 of the bicycle, and a seat tube 12, that is a tube surmounted by a saddle 13 and having at its lower end a housing for a pedal crank axle indicated at 14 in FIG. 1. Each beam is constructed, as will be described in more detail below, to be structurally efficient in the transverse plane and the cruciform formed by the intersecting beams 3 and 4, is rendered structurally efficient in the vertical plane by a tie generally designated 2 in FIG. 2. This tie runs beneath the cruciform and, like the beams 3 and 4, extends between the head tube 10 and the seat tube 12.

The front and rear parts of the frame are separable by means of a first coupling generally designated 30, which is located at the junction 5 of the cruciform. The tie 2 is also separable into front and rear parts by means of a second coupling generally designated 60.

Figure 3:
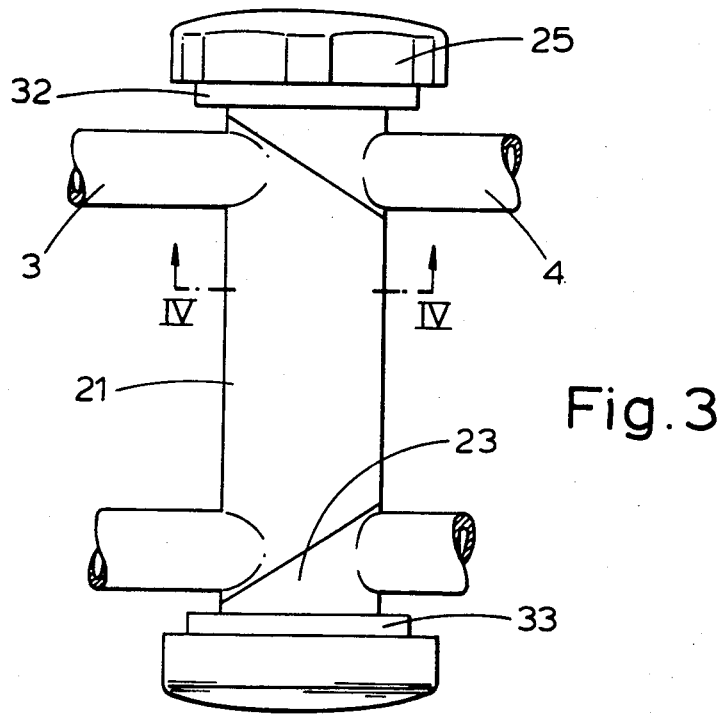
FIG. 3 is a plan view of one of the separable couplings.
Figure 5:
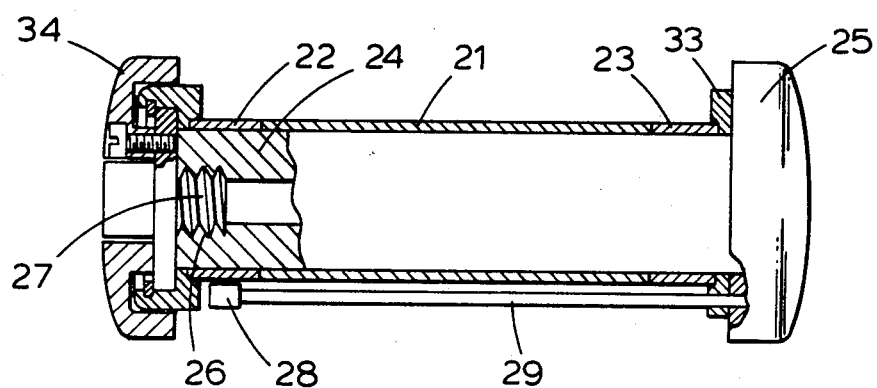
FIG. 5 is a cross sectional view taken along the line V—V of FIG. 4.
Figure 6:
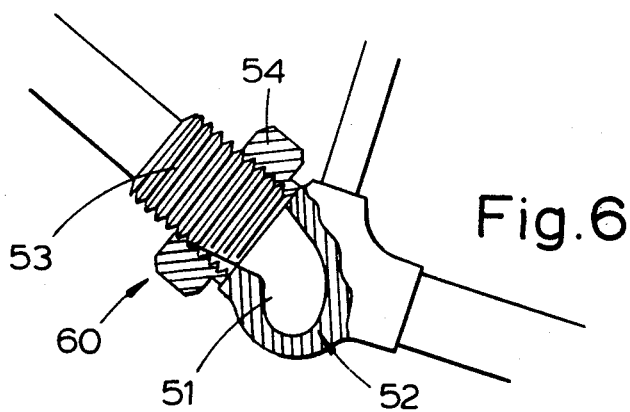
FIG. 6 is a cross sectional view of the second separable coupling.

The first coupling 30 is shown in more detail in FIGS. 3 and 5 while the second coupling 60 is shown in more detail in FIG. 6.

In order to keep the weight low, the frame is made from thin steel tubes. Each of the beams 3 and 4 is formed by two small diameter tubes arranged side by side the diameter being preferably about half an inch. Thus, as best seen in FIGS. 1 and 1A, the beam 3 is formed from two tubes 3a and 3b, while the beam 4 is formed from two tubes 4a and 4b. The twin tubes forming each beam are rendered structurally stiff in the transverse plane by further tubing 3c and 4c jig-bent and brazed between the twin tubes to form a lattice. In the vertical plane, the structural stiffness necessary to support the weight of the rider is provided by the tie 2 and further stiffness is provided by two rods 2b which extend in V-configuration, between the housing for a socket 52 of the coupling 60, described in greater detail below, and part-sleeve members 22 and 23 of the coupling 30 which are attached to the rear part of the frame at the first coupling.

It will be noted that the beams 3 and 4, which intersect to form the cruciform, have their maximum lateral dimension at the junction 5 of the cruciform and that it is at this location that the frame is separable into front and rear parts. This region where the frame has its maximum width is suitably located, so that it does not interfere with the pedalling action of the rider.

Figure 4:
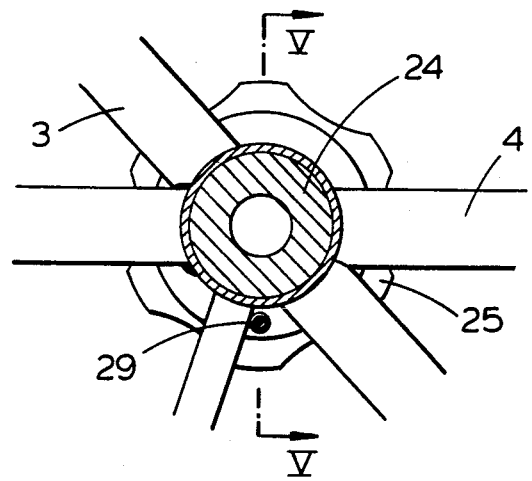
FIG. 4 is a cross sectional view taken along the line IV—IV of FIG. 3.

Referring particularly to FIGS. 3 to 5, the front part of the frame is connected to a sleeve member 21 which is cylindrical and hollow and is cut away to interfit between two hollow cylindrical part sleeve members 22 and 23 which are fixed to the rear part of the frame. The sleeve 21 interfits with the part-sleeve members 22 and 23, to form a continuous hollow cylinder through which can slide a cylindrical stem 24 shown particularly in FIGS. 4 and 5. The stem 24 has at one end a knurled knob 25 while its opposite end is hollow and threaded at 26 to receive a threaded bolt 27. The threaded bolt 27 is held captive in part-sleeve member 22 as will be seen particularly in FIG. 5.

When the stem is rotated by means of the knob 25 to disengage it from the threaded bolt 27, it can then be withdrawn axially from within the sleeve 21, the limit of withdrawal being controlled by a protruberance 28 on a sliding rod 29. The rod 29 slides in an aperture in an annular boss 33 connected to the part-sleeve member 23.

A correspondingly shaped boss 32 is attached to the part-sleeve member 22 and to this part-sleeve member 23 is secured a knob 34 which carries the bolt 27. When the stem 24 has been disengaged from within the sleeve 21, then the sleeve 21 can be moved out of interfitting aligned relationship with part-sleeve members 22 and 23. By these means the first coupling can be disengaged.

The second coupling 60, illustrated in FIGS. 2 and 6 is located below the first coupling 30 and comprises a hook and socket connection. The hook is generally designated 51 and is attached to the front part of the frame. The socket is generaly designated 52, has a threaded housing and is on the rear part of the frame. Just behind the hook 51 is a threaded stem 53 carrying a rotatable nut 54. When the nut 54 is rotated to engage and bear against the housing of socket 52, the hook is maintained within the socket and cannot be released therefrom. However, when the nut 54 is disengaged from bearing against the housing of socket 52, the hook can be disengaged from the socket but only after being partially rotated through perhaps 45° (in a clockwise direction referring to FIG. 6.)

It will therefore be appreciated that the coupling means joining the front and rear parts of the frame provide an arrangement whereby, when the stem 24 of the sleeve joint constituting the first coupling 30 is removed from within the sleeve 21, the frame remains structurally coherent in all directions except one. The exception exists in that on upward force being exerted, the mid region of the frame can be moved upwardly with the second coupling 60 acting as a hinge (the nut 54 having been unscrewed); where upon the sleeve 21 can be disengaged from interfitting with the part sleeves 22 and 23, but with the hook 51 of the second coupling remaining engaged with its socket. The person effecting such separating of the frame may therefore hold the frame with one hand and manipulate the sleeve joint constituting the first coupling 30 with his second hand. Once he has released the first coupling 30 and then unscrewed the nut 54 of the second coupling he can then remove his second hand to that section of the frame, front or rear, which he is not already holding by his first hand. Using both hands he can then lift the frame vertically. The frame will first hinge into the two sections and after a limited degree of hinging rotation, the hook 51 can be disengaged from its socket whereupon the frame is fully separated into two sections for stowing or carrying. The bicycle frame is therefore readily separable into two sections without detracting from the structural stiffness of the frame and without the frame being undesirably heavy.

It will be noted particularly from FIGS. 1 and 1A, that the latticed beams 3 and 4 partially define between them spaces which are suitable for the carrying of small items such as tools or wet weather clothing. The spaces may be further defined by cladding panels.

Also as seen in these drawings a front wheel suspension is mounted on the head tube 10 while a rear wheel suspension is mounted on the seat tube 12. These suspensions may be as known in the art and they may be of the resilient type as also known in the art. For example, the front wheel suspension system may be described in British Patent Specification No. 1 047 783 or U.S. Pat.

No. 3,208,767; while the rear wheel suspension system may be as described in British Patent Specification No. 1 101 442.

I claim:

1. A frame for a bicycle having a head tube for housing a steering column and a seat tube surmounted by a saddle and having at its lower end a housing for a pedal crank axle, the frame comprising two beams extending between the head tube and the seat tube, said beams intersecting one another so that the two beams constitute a cruciform when viewed in side elevation, and including a tie extending, beneath the intersecting beams, between lower regions of the head and seat tubes, said beams each comprising twin peripheral tubes which are structurally interconnected by and spaced apart by a structural web extending between said tubes in each beam so that each beam is structurally efficient in the transverse plane.

2. A frame according to claim 1 wherein each beam comprises twin steel tubes, each less than 0.75 inch in diameter, arranged side by side and maintained in this location by the web means.

3. A frame according to claim 2 wherein the web between the twin tubes is constituted by a lattice of tubes of a diameter smaller than that of the twin tubes.

4. A frame according to claim 1 wherein twin tubes in V-configuration unite the central zone of the tie with the junction of the two beams forming the cruciform.

5. A frame for a bicycle according to claim 1 wherein the front and rear parts of the frame are separably joined to one another by coupling means at the node of the cruciform.

6. A frame for a bicycle according to claim 1 wherein the front and rear parts of the frame are separably joined to one another by two couplings, a first of which coupling is located at the node of the cruciform and the second coupling being located below the first and separably connecting front and rear parts of the tie.

7. A frame according to claim 6 wherein said first and second couplings are of different types, said first coupling being a bolted sleeve joint and said second coupling comprising a hook and socket connection.

* * * * *